(12) United States Patent
Asai (10) Patent No.: US 7,850,228 B2
(45) Date of Patent: Dec. 14, 2010

(54) VEHICLE FRONT STRUCTURE (75) Inventor: Takashi Asai, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 310 days.

(21) Appl. No.: 11/663,227

(22) PCT Filed: Sep. 2, 2005

(86) PCT No.: PCT/IB2005/002775
§ 371 (c)(1),
(2), (4) Date: Mar. 20, 2007

(87) PCT Pub. No.: WO2006/032973
PCT Pub. Date: Mar. 30, 2006

(65) Prior Publication Data
US 2007/0262614 A1 Nov. 15, 2007

(30) Foreign Application Priority Data
Sep. 21, 2004 (JP) .............................. 2004-274166
Jun. 20, 2005 (JP) .............................. 2005-179804

(51) Int. Cl.
B60K 28/00 (2006.01)
(52) U.S. Cl. ...................... 296/203.02; 296/203.01; 180/299; 180/68.3
(58) Field of Classification Search ............ 180/232, 180/271, 291, 299, 68.1, 68.2, 68.3, 68.4, 180/68.5, 68.6; 123/392; 293/102, 113, 293/129, 132, 138, 140, 144, 146; 296/35.2, 296/187.01, 187.03, 187.09, 203.02; 280/784
See application file for complete search history.

(56) References Cited

U.S. PATENT DOCUMENTS 4,031,978 A * 6/1977 Taylor ......................... 180/232
4,440,435 A * 4/1984 Norlin ................... 296/187.09
4,618,023 A * 10/1986 Norlin ......................... 180/312

(Continued)

FOREIGN PATENT DOCUMENTS

EP 1 225 072 7/2002

(Continued)

OTHER PUBLICATIONS

International Search Report dated Jan. 2, 2006.
Written Opinion of the ISA.
Chinese Office Action dated Mar. 7, 2008.
Notification of Reason(s) for Refusal for JP Appl. No. 2005-179804 dated Jan. 5, 2010.

Primary Examiner—Paul N Dickson
Assistant Examiner—Brodie Follman
(74) Attorney, Agent, or Firm—Finnegan, Henderson, Farabow, Garrett & Dunner, LLP (57) ABSTRACT In a vehicle front structure (10), a cross member (52) which is disposed above paired side members (12) includes vehicle width-direction both end portions extending toward a rear side of the vehicle. The cross member (52) is connected with vehicle front-side portions of the paired suspension towers (42) at edges of the extending portions. Therefore, when a vehicle has a frontal collision at high speed, a collision load applied to the cross member (52) can be effectively received by the paired suspension towers (42), and can be transmitted to the paired suspensions. Thus, the cross member (52) can effectively receive the collision load, and can efficiently transmit the collision load to the rear side of the vehicle.

10 Claims, 9 Drawing Sheets

U.S. PATENT DOCUMENTS

| | | | |
|---|---|---|---|
| 5,141,068 A * | 8/1992 | Mendicino | 180/68.3 |
| 5,597,198 A * | 1/1997 | Takanishi et al. | 296/193.09 |
| 5,794,733 A * | 8/1998 | Stosel et al. | 180/68.1 |
| 5,860,685 A * | 1/1999 | Horney et al. | 293/113 |
| 6,540,284 B2 * | 4/2003 | Miyata | 296/203.02 |
| 6,698,539 B2 * | 3/2004 | Decuir | 180/68.3 |
| 6,715,573 B2 * | 4/2004 | Emori et al. | 180/68.4 |
| 6,893,065 B2 * | 5/2005 | Seksaria et al. | 293/133 |
| 7,008,007 B2 * | 3/2006 | Makita et al. | 296/187.09 |
| 7,025,410 B2 * | 4/2006 | Kosaka | 296/187.09 |
| 7,048,326 B2 * | 5/2006 | Yasui | 296/203.02 |
| 7,077,442 B2 * | 7/2006 | Arns | 293/155 |
| 7,219,954 B2 * | 5/2007 | Gomi et al. | 296/203.02 |
| 7,246,966 B2 * | 7/2007 | Jolley | 403/268 |
| 7,270,368 B2 * | 9/2007 | Aonuma et al. | 296/203.02 |
| 7,343,998 B2 * | 3/2008 | Morin et al. | 180/233 |
| 7,461,890 B2 * | 12/2008 | Yatsuda | 296/203.02 |
| 2001/0033094 A1 * | 10/2001 | Sano et al. | 296/194 |
| 2002/0040819 A1 * | 4/2002 | Miyata | 180/68.5 |
| 2002/0096384 A1 | 7/2002 | Yoshida et al. | |
| 2003/0107241 A1 * | 6/2003 | Ritchie et al. | 296/188 |
| 2004/0051345 A1 * | 3/2004 | Gabbianelli et al. | 296/203.01 |
| 2004/0183338 A1 | 9/2004 | Makita et al. | |
| 2004/0195862 A1 * | 10/2004 | Saeki | 296/187.09 |
| 2005/0067860 A1 * | 3/2005 | Makita et al. | 296/203.02 |
| 2005/0077711 A1 * | 4/2005 | Yasui et al. | 280/735 |
| 2006/0043711 A1 * | 3/2006 | Kuze et al. | 280/735 |
| 2006/0076803 A1 * | 4/2006 | Kreutzberg | 296/203.01 |
| 2008/0224502 A1 * | 9/2008 | Miki | 296/203.02 |
| 2009/0085362 A1 * | 4/2009 | Terada et al. | 293/132 |
| 2009/0085373 A1 * | 4/2009 | Terada et al. | 296/187.09 |

FOREIGN PATENT DOCUMENTS

| | | |
|---|---|---|
| EP | 1 332 949 | 8/2003 |
| EP | 1332949 A2 * | 8/2003 |
| JP | 58-150520 | 10/1983 |
| JP | 59-57025 | 4/1984 |
| JP | 03-128776 | 5/1991 |
| JP | A-03-284480 | 12/1991 |
| JP | 04-154487 | 5/1992 |
| JP | 04-325383 | 11/1992 |
| JP | 05-139173 | 6/1993 |
| JP | A-07-069241 | 3/1995 |
| JP | 10-203179 | 8/1998 |
| JP | A-2000-177636 | 6/2000 |
| JP | 2001-30949 | 2/2001 |
| JP | 2002-356179 | 12/2002 |
| JP | 2004-237957 | 8/2004 |

* cited by examiner

VEHICLE FRONT STRUCTURE

BACKGROUND OF THE INVENTION

1. Field of the Invention

The invention relates to a vehicle front structure in which a cross member is provided above paired side members.

2. Description of the Related Art

A vehicle front structure is disclosed, in which one of paired brackets is fixed to one of paired side rails, and the other of the paired brackets is fixed to the other of the paired side rails, and a collision input member is fixed between the paired brackets via a pipe member. For example, Japanese Patent Application Publication No. JP-A-7-69241 discloses such a vehicle front structure.

However, in this vehicle front structure, the shock input member and the pipe member are simply supported by an upper surface of the side rails via the brackets. Therefore, when a vehicle has a frontal collision, a large collision load is input particularly to lower ends of the brackets from the collision input member. Thus, there is a possibility that the collision input member cannot effectively receive the collision load, and cannot efficiently transmit the collision load to a rear side of the vehicle.

DISCLOSURE OF THE INVENTION

An embodiment of the invention seeks to provide a vehicle front structure in which a cross member above paired side members can effectively receive a collision load.

According to a first aspect of the invention, a vehicle front structure includes paired side members which are disposed at a right side portion and a left side portion in a front portion of a vehicle; paired suspension towers which are disposed at a right side portion and a left side portion in the front portion of the vehicle, and which support paired suspensions on a vehicle front side; and a cross member which is disposed above the paired side members, which includes extending portions that are disposed at right and left sides in a vehicle lateral direction so as to extend toward a rear side of the vehicle, and which is connected with vehicle front-side portions of the paired suspension towers at edges of the extending portions.

In the vehicle front structure according to the first embodiment, the paired side members are disposed at the right side portion and the left side portion in the front portion of the vehicle, and the paired suspension towers which support the paired suspensions on the vehicle front side are disposed at the right side portion and the left side portion in the front portion of the vehicle.

The cross member is disposed above the paired side members, and includes extending portions that are disposed at right and left sides in the vehicle lateral direction so as to extend toward the rear side of the vehicle. The cross member is connected with the vehicle front-side portions of the paired suspension towers at the edges of the extending portions.

Therefore, when the vehicle has a frontal collision, a collision load applied to the cross member can be received by the suspension towers at the vehicle front-side portions. Further, the collision load applied to the vehicle front-side portions of the suspension towers can be transmitted to the suspensions, and the collision load can be distributed through the suspensions. Thus, the cross member can effectively receive the collision load, and can efficiently transmit the collision load to the rear side of the vehicle. Accordingly, it is possible to effectively distribute the collision load through the cross member, to suppress a decrease in an absorption amount of the collision load, and to make a deformation stroke of the vehicle short.

Further, even when the vehicle has a frontal collision with another vehicle whose vehicle height is large, the cross member can effectively receive the collision load, and can efficiently transmit the collision load to the rear side of the vehicle. Thus, the deformation stroke of the vehicle can be made short.

In the first aspect of the invention, the vehicle front structure may include a bumper reinforce which is connected with vehicle front-side ends of the paired side members, and which is disposed on a vehicle front side of the cross member, and the cross member is connected with the paired side members.

With this configuration, the bumper reinforce which is disposed on the vehicle front side of the cross member is connected with the vehicle front-side ends of the paired side members. Therefore, when the vehicle has a frontal collision, the collision load is transmitted from the bumper reinforce to the side members (the rear side of the vehicle).

The cross member is connected with the paired side members.

Therefore, when the vehicle has a frontal collision (heavy collision) at high speed, the collision load applied to the cross member can be effectively received by the paired suspension towers, and can be received by the connection portions between the cross member and the paired side members. Thus, the cross member can receive the collision load even more effectively, and can transmit the collision load to the rear side of the vehicle even more efficiently.

In the vehicle front structure according to the first aspect of the invention, paired crash boxes may be disposed at vehicle front-side end portions of the paired side members; each of the paired crash boxes may have low compressive strength in an axial direction as compared to a portion of each side member other than the crash box; and vehicle rear-side ends of the paired crash boxes may be disposed at positions matching positions of vehicle front-side ends of connection portions between the cross member and the paired side members and a position of a vehicle front-side end of the cross member in a vehicle longitudinal direction, or the vehicle rear-side end of the paired crash boxes may be disposed on a vehicle front side of the vehicle front-side ends of the connection portions between the cross member and the paired side members and the vehicle front-side end of the cross member.

With this configuration, in a case where the vehicle has a frontal collision (light collision) at low speed, and only the crash boxes of the side members are deformed, the collision load is not input to the cross member. Therefore, it is possible to prevent damage to the cross member, the connection portions between the cross member and the paired side members, and the paired suspension towers. In addition, it is possible to prevent occurrence of force for damaging an object with which the cross member collides.

Also, particularly in the case where the vehicle front-side end of the cross member is disposed at the position matching the positions of the vehicle front rear-side ends of the paired crash boxes in the vehicle longitudinal direction, when the vehicle has a frontal collision at high speed, the collision load is input to the cross member immediately after the crash boxes have finished absorbing the collision load. Thus, it is possible to suppress a decrease in the absorption amount of the collision load even effectively, and to make the deformation stroke of the vehicle even shorter.

The aforementioned vehicle front structure may further include a load transmission member which connects a power unit in the front portion of the vehicle with the cross member in the vehicle longitudinal direction so that a load can be transmitted between the cross member and the power unit.

With this configuration, when the vehicle has a frontal collision at high speed, the collision load is transmitted from the cross member to the power unit by the load transmission member which connects the cross member to the power unit in the vehicle longitudinal direction, the power unit being disposed in the front portion of the vehicle. Therefore, the collision load is input to the power unit immediately after the collision load starts to be input to the cross member. Thus, it is possible to suppress a decrease in the absorption amount of the collision load even effectively, and to make the deformation stroke of the vehicle even shorter.

In the aforementioned vehicle front structure, the power unit in the front portion of the vehicle may be disposed on a vehicle rear side of the cross member.

With this configuration, when the vehicle has a frontal collision at high speed, the collision load can be transmitted from the cross member to the power unit.

The aforementioned vehicle front structure may further include an output shaft which is provided in an engine in the power unit in the front portion of the vehicle, which is disposed along the vehicle lateral direction, and which outputs driving force of the engine; and a differential which is provided in the power unit, which is disposed on a vehicle front side of the output shaft, and which transmits the driving force from the output shaft to a front wheel of the vehicle.

With this configuration, the output shaft which is provided in the engine in the power unit in the front portion of the vehicle is disposed along the vehicle lateral direction. The differential which is provided in the power unit transmits the driving force of the engine output from the output shaft to the front wheel of the vehicle. The differential is disposed on the vehicle front side of the output shaft. Therefore, as compared to a case where the differential is disposed on a vehicle rear side of the output shaft, the front wheel is disposed so as to be close to a front side of the vehicle. Thus, when the vehicle has a frontal collision at high speed, it is possible to distribute the collision load to the front wheel early, to suppress a decrease in the absorption amount of the collision load even more effectively, and to make the deformation stroke of the vehicle even shorter.

The aforementioned vehicle front structure may further include a sub frame which has a rectangular frame shape in a plan view, and on which the power unit in the front portion of the vehicle is mounted.

With this configuration, when the vehicle has a frontal collision at high speed, it is possible to effectively distribute the collision load to the sub frame, to suppress a decrease in the absorption amount of the collision load even more effectively, and to make the deformation stroke of the vehicle stroke even shorter.

In the aforementioned vehicle front structure, a distance between connection portions between the cross member and the paired side members may be shorter than a distance between connection portions between the cross member and the paired suspension towers.

With this configuration, when the vehicle has a frontal collision at high speed, as compared to a case where a distance between the connection portions between the cross member and the paired side members is longer than a distance between the connection portions between the cross member and the paired suspension towers, the cross member can receive the collision load even more effectively, and can transmit the collision load to the rear side of the vehicle even more efficiently.

In the aforementioned vehicle front structure, the cross member may have a tube shape. With this configuration, rigidity of the cross member can be made high.

The aforementioned vehicle front structure may further include intake air ports which are formed in the cross member, and which are opened to insides of the suspension towers; and an air cleaning mechanism which is disposed between the power unit in the front portion of the vehicle and the cross member in the vehicle longitudinal direction, which is connected with the cross member, and which cleans air that is taken in from the intake air ports through the cross member.

With this configuration, the cross member is used as an air intake duct, and the air that is taken to the air cleaning mechanism from the intake air ports of the cross member through the cross member is cleaned.

Each of the intake air ports of the cross member is opened to the inside of the corresponding suspension tower. Therefore, unlike a case where the intake air ports of the cross member are opened to an inside of an engine compartment, cool air can be taken into the air cleaning mechanism.

Further, the air cleaning mechanism is disposed between the power unit disposed in the front portion of the vehicle and the cross member in the vehicle longitudinal direction. Therefore, when the vehicle has a frontal collision at high speed, the collision load can be transmitted from the cross member to the power unit through the air cleaning mechanism.

DETAILED DESCRIPTION OF THE EMBODIMENTS

First Embodiment

Figure 1:
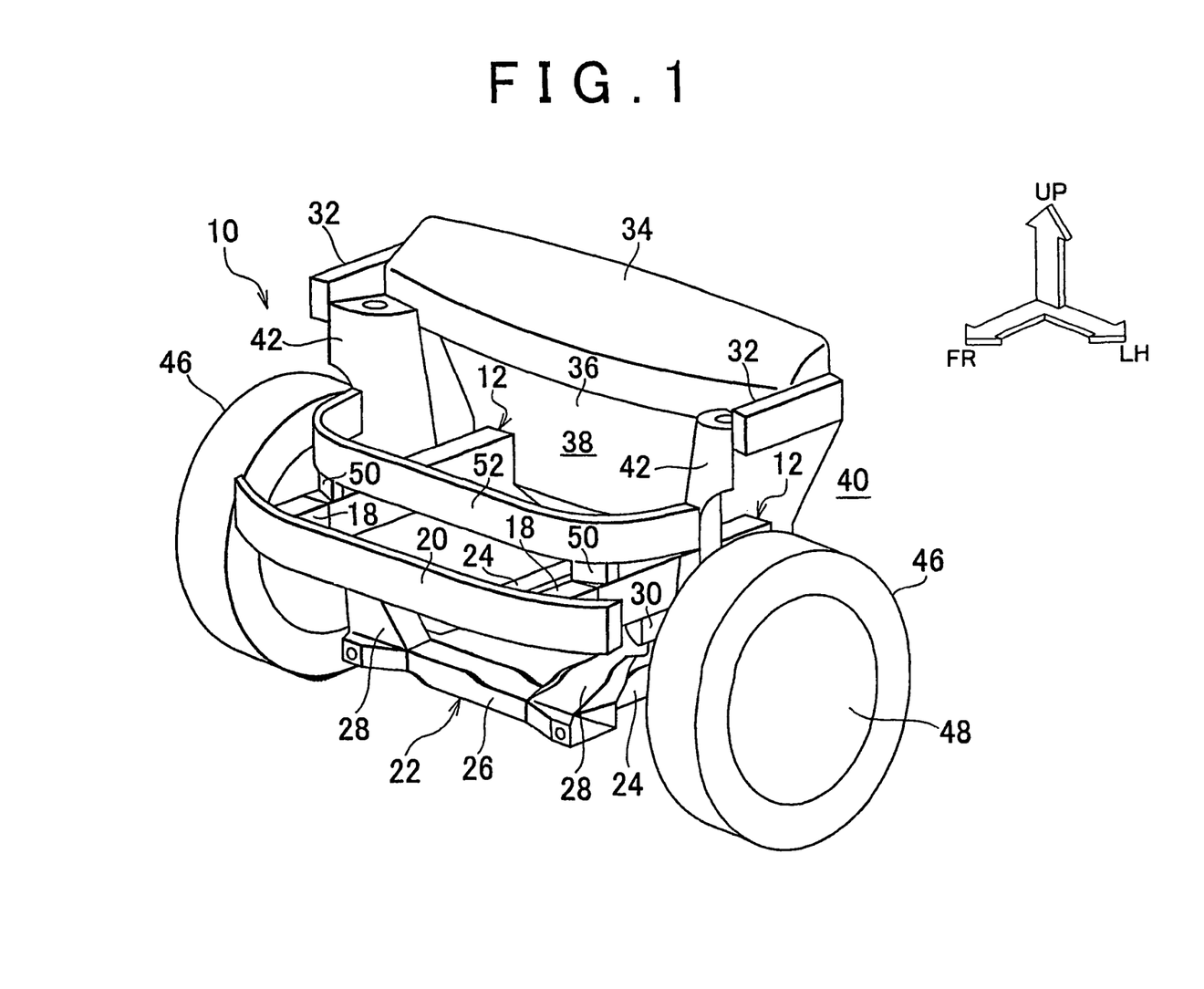
FIG. 1 is a schematic perspective view showing a vehicle front structure according to a first embodiment of the invention when diagonally seen from a position ahead of, and on a left side of a vehicle.
Figure 2:
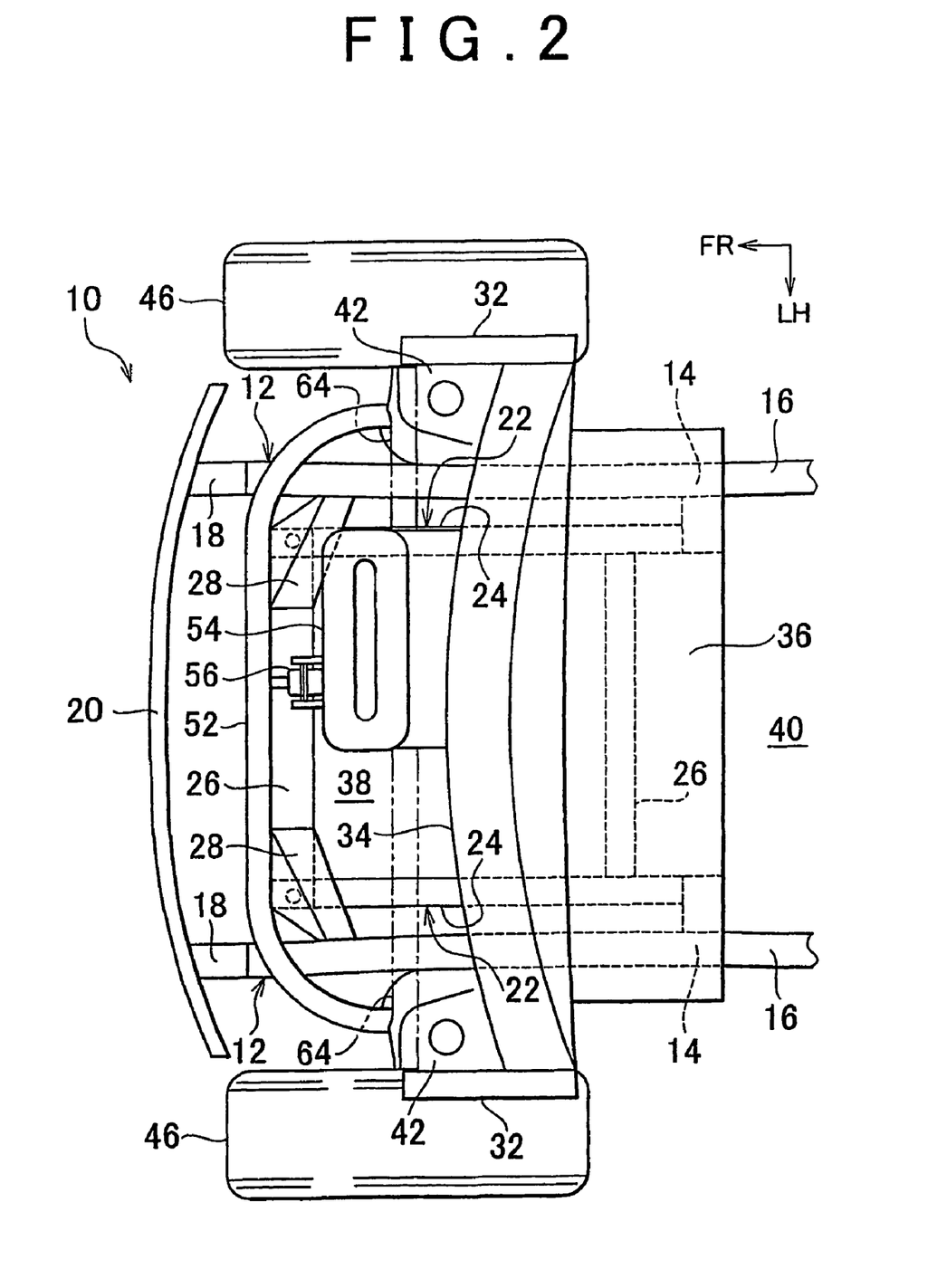
FIG. 2 is a plan view showing the vehicle front structure according to the first embodiment of the invention when seen from above the vehicle.
Figure 3:
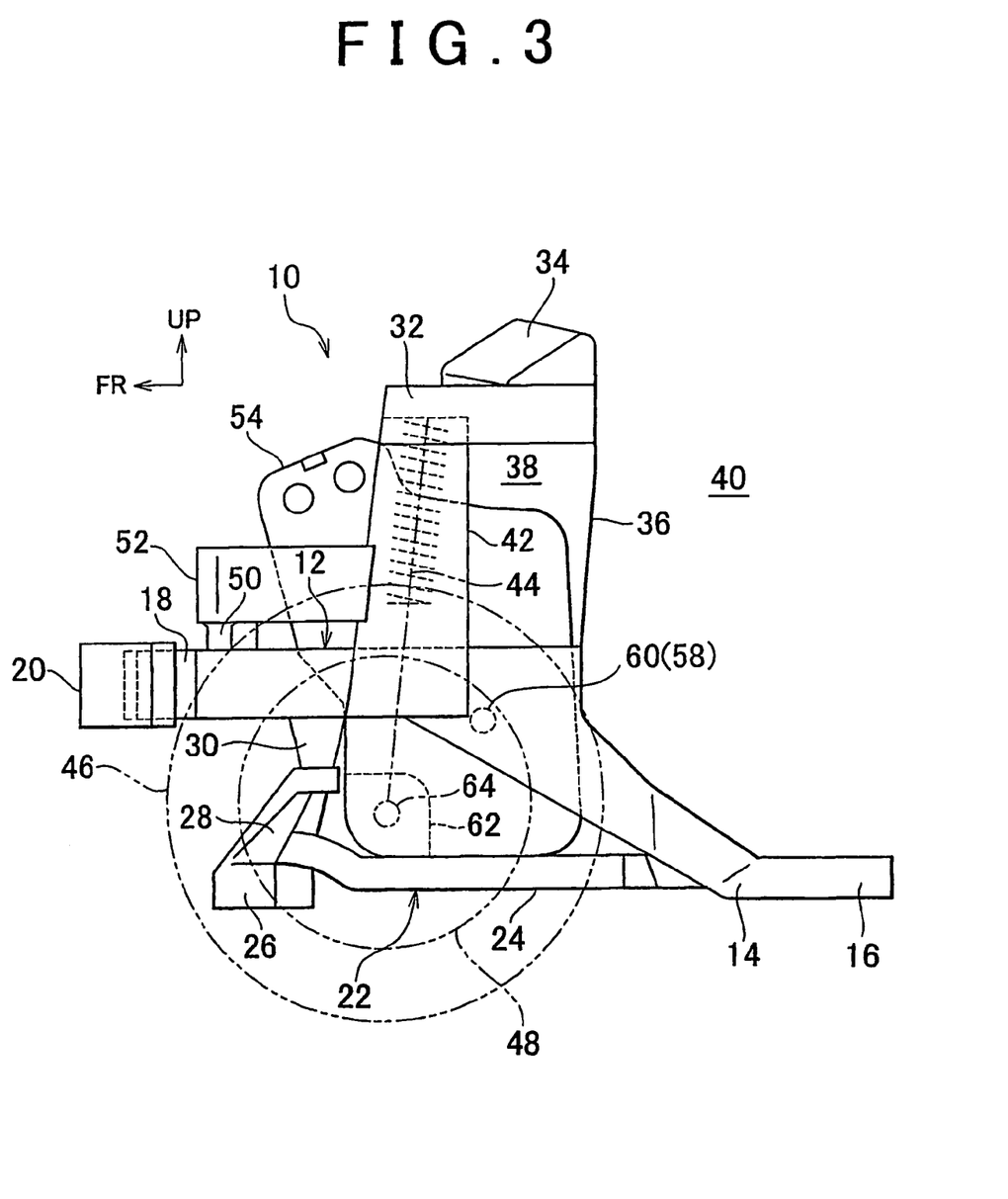
FIG. 3 is a lateral view showing the vehicle front structure according to the first embodiment of the invention when seen from a position on the left side of the vehicle.

FIG. 1 is a schematic perspective view showing a vehicle front structure 10 according to a first embodiment of the invention when diagonally seen from a position ahead of, and on a left side of a vehicle. Further, FIG. 2 is a plan view showing the vehicle front structure 10 according to the first embodiment of the invention when seen from above the vehicle. FIG. 3 is a lateral view showing the vehicle front structure 10 according to the first embodiment of the invention when seen from a position on the left side of the vehicle. In figures, an arrow FR indicates a position ahead of the vehicle, an arrow LH indicates a position on the left side of the vehicle, and an arrow UP indicates a position above the vehicle.

The vehicle front structure 10 according to the embodiment includes paired front side members 12 having a long rectangular tube shape, which serve as side members. The paired front side members 12 are disposed along a vehicle longitudinal direction at a right side portion and at a left side portion in a front portion of the vehicle. A portion of each front side member 12 other than a vehicle rear-side portion is horizontally disposed, and the vehicle rear-side portion of each front side member 12 is inclined downward toward a rear side of the vehicle. A kick portion 14 is disposed at a vehicle rear-side end of each front side member 12. Each of the kick portions 14 is connected (fixed) to a corresponding center side member 16. Each of the paired center side members 16 has a long plate shape, and has a U-shape cross section. The paired center side members 16 are horizontally disposed along the vehicle longitudinal direction at a right side bottom portion, and at a left side bottom portion in a vehicle longitudinal-direction intermediate portion of the vehicle.

A crash box 18 is disposed at a vehicle front-side end portion of each front side member 12. Each crash box 18 has low compressive strength in an axial direction as compared to a portion of the front side member 12 other than the crash box 18.

The vehicle front-side ends of the paired front side members 12 (that are, crash boxes 18) are connected with a front bumper reinforce 20 having a long rectangular tube shape, which serves as a bumper reinforce. The front bumper reinforce 20 is horizontally disposed along a vehicle width direction in a front end of the vehicle.

A front sub frame 22 which serves as a sub frame is disposed below the paired front side members 12. The front sub frame 22 has paired sub side members 24 having a long rectangular tube shape. The paired sub side members 24 are disposed substantially horizontally along the vehicle longitudinal direction at a right side portion and at a left side portion in the front portion of the vehicle. A vehicle rear-side end of each of the sub side members 24 is connected with the kick portion 14 of the corresponding front side member 12. One of sub cross members 26 having a long rectangular tube shape connects vehicle front-side ends of the paired sub side members 24, and the other sub cross member 26 connects the vehicle rear-side ends of the paired sub side members 24. Each sub cross member 26 is horizontally disposed in the vehicle width direction. Thus, the front sub frame 22 has a substantially rectangular frame shape in a plan view. A vehicle front-side end of the front sub frame 22 (the sub cross member 26 on a vehicle front side) is disposed on the vehicle rear side of a vehicle rear-side end of each crash box 18. Also, each of vehicle width-direction end portions of the side sub cross member 26 on the vehicle front side is connected with (supported by) the corresponding front side member 12 at a portion on the vehicle rear side of the crash box 18, via a corresponding lower support portion 28 provided on the sub cross member 26 side and a corresponding upper support portion 30 provided on the front side member 12 side.

Paired apron upper members 32 having a rectangular tube shape are provided above the paired front side member 12. The paired apron upper members 32 are horizontally disposed along the vehicle longitudinal direction at a right side portion and at a left side portion in the front portion of the vehicle. The paired apron upper members 32 are integrated with paired front pillars (not shown) of the vehicle.

A cowl 34 connects vehicle rear side portions of the paired apron upper members 32. The cowl 34 has a plate shape and a U-shape cross section. A lower end of the cowl 34 is connected with a dash panel 36 having a plate shape. The dash panel 36 is provided so as to extend from the lower end of the cowl 34 to a portion between the vehicle rear-side portions of the front side members 12. The dash panel 36 serves as a partition between an engine compartment 38 and a cabin (vehicle compartment) 40 on the vehicle rear side.

Each of paired suspension towers 42 is provided so as to stand on an outer side of the corresponding front side member 12 in the vehicle width direction. Each suspension tower 42 is connected with a corresponding vehicle width-direction end portion of the cowl 34, a side surface of the corresponding apron upper member 32, and a side surface of the corresponding front side member 12. Each suspension tower 42 includes an upper wall and a side wall having a curved plate shape so that strength of each suspension tower 42 is particularly increased. In each suspension tower 42, a suspension 44 is supported. Each suspension 44 elastically supports, at a lower end thereof, a disc wheel 48 of a front wheel 46 of the vehicle such that the disc wheel 48 can be moved in a vertical direction.

Each of braces 50 (vertical columns) having a rectangular tube shape is connected with an upper surface of the corresponding front side member 12 at a portion on the vehicle rear side of the vehicle rear-side end of the corresponding crash box 18. Each brace 50 stands on the corresponding front side member 12.

A cross member 52 is disposed above the paired front side members 12. The cross member 52 has a long rectangular tube shape, and a closed cross section. The cross member 52 includes a vehicle width-direction center portion that is horizontally disposed along the vehicle width direction. The cross member 52 also includes the vehicle width-direction both end portions that are curved and extend toward the rear side of the vehicle. That is, the cross member 52 includes extending portions at the both sides in the vehicle width direction. The cross member 52 is fixed to upper ends of the braces 50 at curved portions in the vehicle width-direction both end portions of the cross member 52. Thus, the cross member 52 is connected with the front side members 12. Also, the cross member 52 is fixed to vehicle front-side surfaces of the suspension towers 42 at both end edges of the cross member 52 in the vehicle width direction (edges of the extending portions of the cross member 52). A vehicle front-side end (a vehicle front side-surface of the vehicle width-direction center portion) of the cross member 52 is disposed at a position matching a position of the vehicle rear-side end of each crash box 18 in the vehicle longitudinal direction. A distance between connection portions between the cross member 52 and the paired braces 50 (connection portions between the cross member 52 and the paired front side members 12) is shorter than a distance between connection portions between the cross member 52 and the paired suspension towers 42. Thus, a shape obtained by connecting the connection portions between the cross member 52 and the paired braces 50 and the connection portions between the cross member 52 and the paired suspension towers 42 is a trapezoid shape in which an edge on the vehicle front side is shorter than an edge on the vehicle rear side.

In the engine compartment 38, a power unit 54 (not shown in FIG. 1) is provided. The power unit 54 is mounted on, and supported by the front sub frame 22. The vehicle front-side end of the front sub frame 22 is disposed on the vehicle front side of a vehicle front-side end of the power unit 54. The power unit 54 is surrounded by the paired front side members 12, the dash panel 36, and the cross member 52. The power unit 54 and the cross member 52 are opposed to each other in the vehicle longitudinal direction. A vehicle front-side surface of the power unit 54 is connected with the vehicle width-direction center portion of the cross member 52 in the vehicle longitudinal direction, using a torque rod 56 which serves as a load transmission member (torque transmission member). A crank shaft 60 which serves as an output shaft is provided in an engine 58 in the power unit 54. The crank shaft 60 is transversely disposed along the vehicle width direction, and outputs driving force of the engine 58.

A differential 62 is provided in a lower portion of the power unit 54. The differential 62 is disposed on the vehicle front side of the crank shaft 60, and is connected with paired drive shafts 64. The paired drive shafts 64 extend from the power unit 54 to both outer sides in the vehicle width direction. Each of the paired drive shafts 64 is connected with the disc wheel 48 of the corresponding front wheel 46. The differential 62 transmits the driving force of the engine 58 output from the crank shaft 60 to the paired front wheels 46 via the paired drive shafts 64.

Thus, the vehicle according to the embodiment of the invention is a front engine front drive vehicle.

Next, effects of this embodiment will be described. In the vehicle front structure 10 thus configured, when the vehicle has a frontal collision, a collision load is transmitted from the front bumper reinforce 20 to the front side members 12 (that is, the rear side of the vehicle). Thus, when the vehicle has a frontal collision at low speed (light collision), only the crash box 18 of each front side member 12 is deformed. Meanwhile, when the vehicle has a frontal collision at high speed (heavy collision), a portion of each front side member 12 other than the crash box 18 is also deformed, in addition to the crash box 18.

The cross member 52 is disposed above the paired front side members 12 and on the vehicle rear side of the front bumper reinforce 20. The cross member 52 includes the vehicle width-direction both end portions that are curved and extend toward the rear side of the vehicle. That is, the cross member 52 includes the extending portions at the both sides in the vehicle width direction. Thus, the cross member 52 is connected with the vehicle front-side surfaces of the paired suspension towers 42 at the edges of the extending portions of the cross member 52.

Accordingly, when the vehicle has a frontal collision at high speed, a collision load applied to the cross member 52 can be received by the paired suspension towers 42 whose strength is particularly increased, at the vehicle front-side portions. Further, the collision load applied to the vehicle front-side portions of the paired suspension towers 42 can be transmitted to the paired suspensions 44, and the collision load can be distributed through the paired suspensions 44.

Thus, the cross member 52 can effectively receive the collision load, and can efficiently transmit the collision load to the rear side of the vehicle.

Further, the paired front side members 12 are connected with the paired braces 50, and the paired braces 50 are connected with the cross member 52. Thus, the cross member 52 is connected with the paired front side members 12. Therefore, the collision load applied to the cross member 52 can be received by the paired braces 50 (the connection portions between the cross member 52 and the paired front side members 12), and can be distributed to the paired front side members 12. Thus, the cross member 52 can receive the collision load even more effectively, and can transmit the collision load to the rear side of the vehicle even more efficiently.

Further, the cross member 52 is connected with the paired front side members 12 at the curved portions in the vehicle width-direction both end portions of the cross member 52 through the paired braces 50. That is, the cross member 52 is not connected with the paired front side members 12 at vehicle width-direction both end edge positions of the cross member 52 (i.e., at the positions at which the collision load applied to the cross member 52 is received). Instead, the cross member 52 is connected with the paired front side members 12 at the positions close to positions at which the collision load is input to the cross member 52. Therefore, it is possible to suppress displacement of the cross member 52 in the vehicle width direction with respect to the paired front side members 12 when the collision load is input to the cross member 52. Also, it is possible to suppress a change in the angles of the vehicle width-direction both end portions of the cross member 52 with respect to the suspension towers 42. Thus, the collision load applied to the cross member 52 can be reliably received by the paired suspension towers 42. Also, it is possible to reduce the necessity of reinforcement for increasing at least one of rigidity of the cross member 52 itself and rigidity of the connection between the cross member 52 and the suspension towers 42, in order to suppress displacement of the cross member 52 in the vehicle width direction with respect to the suspension towers 42.

Also, the distance between the connection portions between the cross member 52 and the paired braces 50 is shorter than the distance between the connection portions between the cross member 52 and the paired suspension towers 42. The connection portions between the cross member 52 and the paired suspension towers 42 are disposed on the outer side of the connection portions between the cross member 52 and the paired braces 50 in the vehicle width direction. Therefore, as compared to a case where the distance between the connection portions between the cross member 52 and the paired braces 50 is longer than the distance between the connection portions between the cross member 52 and the paired suspension towers 42, the collision load applied to the cross member 52 can be received by the paired suspension towers 42 even more effectively. Thus, the cross member 52 can receive the collision load even more effectively, and can transmit the collision load to the rear side of the vehicle even more efficiently.

Further, as described above, the cross member 52 is connected with the paired front side members 12 at the curved portions in the vehicle width-direction both end portions of the cross member 52 through the paired braces 50. Also, the connection portions between the cross member 52 and the paired suspension towers 42 are disposed on the outer side of the connection portions between the cross member 52 and the paired braces 50 in the vehicle width direction. Therefore, when one side (a right side or a left side) of the front portion of the vehicle collides with an object at high speed, it is possible to reduce the possibility that the cross member 52 is deformed at a collision side (for example, at the right side of the vehicle), the collision load cannot be transmitted to the suspension towers 42, and the collision load cannot be transmitted from the cross member 52 to the suspension towers 42 at a side opposite to the collision side (for example, at the left side of the vehicle). Also, the cross member 52 can transmit the collision load from the collision side to the paired suspension towers 42. Thus, the collision load can be effectively received by the paired suspension towers 42.

Accordingly, after the crash boxes 18 have finished absorbing the collision load, it is possible to effectively distribute the collision load, to suppress a decrease in an absorption amount of the collision load, and to make a deformation stroke of the vehicle short.

Further, the vehicle front-side end (the vehicle front-side surface of the vehicle width-direction center portion) of the cross member 52 is disposed at the position matching the positions of the vehicle rear-side ends of the paired crash box 18 in the vehicle longitudinal direction. Therefore, the collision load is input to the cross member 52 immediately after the crash boxes 18 have finished absorbing the collision load. Further, the cross member 52 and the power unit 54 are opposed to each other in the vehicle longitudinal direction, and are connected with each other in the vehicle longitudinal direction using the torque rod 56. Therefore, the collision load is input to the power unit 54 via the torque rod 56 immediately after the collision load starts to be input to the cross member 52. Thus, after the crash boxes 18 have finished absorbing the collision load, it is possible to suppress a decrease in the absorption amount of the collision load even more effectively, and to make the deformation stroke of the vehicle even shorter.

Also, in the power unit 54, the differential 62 is disposed on the vehicle front side of the crank shaft 60 of the engine 58. Therefore, as compared to the case where the differential 62 is disposed on the vehicle rear side of the crank shaft 60, the front wheels 46 are disposed so as to be close to a front side of the vehicle. Thus, after the crash boxes 18 have finished absorbing the collision load, the collision load can be distributed to the front wheels 46 early. Since the front wheels 46 collides with a vehicle body on the vehicle rear side of the front wheels 46, the disc wheels 48 are deformed, whereby the collision load is absorbed. Thus, it is possible to suppress a decrease in the absorption amount of the collision load even more effectively, and to make the deformation stroke of the vehicle even shorter.

Further, the front sub frame 22 has a substantially rectangular frame shape in a plan view. The vehicle front-side end of the front sub frame 22 is disposed on the vehicle front side of the vehicle front-side end of the power unit 54. Thus, after the crash boxes 18 have finished absorbing the collision load, it is possible to effectively distribute the collision load to the front sub frame 22 early, to suppress a decrease in the absorption amount of the collision load even more effectively, and to make the deformation stroke of the vehicle even shorter.

Accordingly, even in a case where a length of the engine compartment 38 in the vehicle longitudinal direction is short, for example, in a case where the vehicle is a compact vehicle, since the deformation stroke of the vehicle is made short, it is possible to suppress deformation of the cabin 40 caused by deformation of the dash panel 36. Further, since the collision load is effectively distributed, it is possible to reduce the collision load input to the kick portions 14 of the front side members 12. Thus, it is possible to eliminate the necessity of intensively reinforcing the kick portions 14. That is, it is possible to eliminate the necessity of increasing mass of the kick portions 14.

Figure 4:
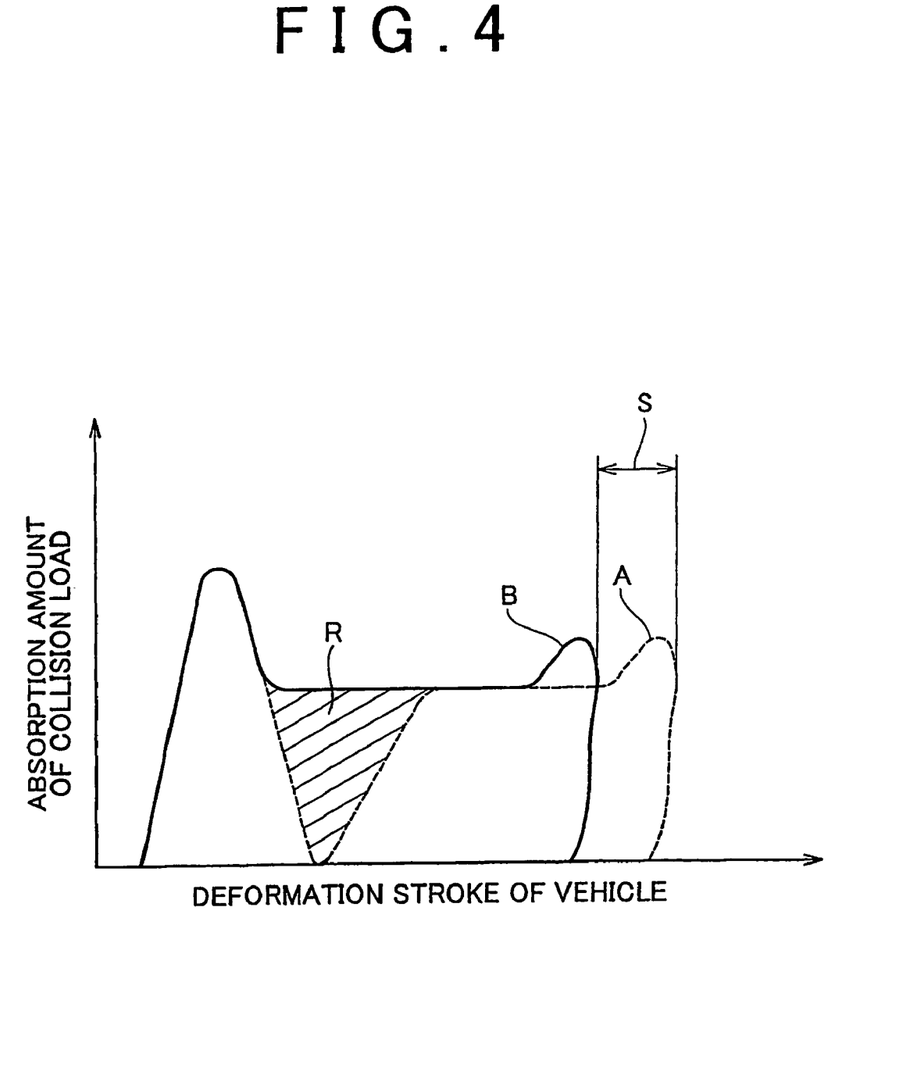
FIG. 4 is a graph showing a relationship between a deformation stroke of a vehicle and an absorption amount of a collision load in each of a vehicle front structure according to the first embodiment of the invention and a conventional vehicle front structure.

In a conventional vehicle front structure in which the front sub frame 22 and the cross member 52 are not provided, and the differential 62 is disposed on the vehicle rear side of the crank shaft 60, a stroke in which the collision load is not effectively absorbed occurs during a period after the crash boxes 18 have finished absorbing the collision load until the collision load starts to be input to the power unit 54, as shown by a broken line A in FIG. 4. Accordingly, the absorption of the collision load is decreased (refer to a region R in FIG. 4). As a result, the deformation stroke of the vehicle is made long.

Meanwhile, in the vehicle front structure 10 according to the embodiment of the invention, it is possible to prevent a decrease in the absorption amount of the collision load during the period after the crash boxes 18 have finished absorbing the collision load until the collision load starts to be input to the power unit 54, as shown by a solid line B in FIG. 4. Therefore, as compared to the conventional vehicle front structure, the deformation stroke of the vehicle can be made short by a stroke S in FIG. 4.

As described above, the cross member 52 is disposed above the paired front side members 12, and the cross member 52 can effectively receive the collision load, and can efficiently transmit the collision load to the rear side of the vehicle. Therefore, when one vehicle has a frontal collision with another vehicle whose vehicle height is large such as a sport utility vehicle (SUV) (which serves as a barrier), the cross member 52 can suppress a phenomenon in which a side member of the other vehicle is inserted into the one vehicle (a so-called underride phenomenon). Accordingly, it is possible to make the deformation stroke of the vehicle short, and to suppress deformation of the cabin 40 caused by deformation of the dash panel 36.

Further, as described above, the vehicle front-side end of the cross member 52 is disposed at the position matching the positions of the vehicle rear-side ends of the paired crash boxes 18 in the vehicle longitudinal direction. In addition, a vehicle front-side end of each of the paired braces 50 at lower end is disposed on the vehicle rear side of the vehicle rear-side end of each of the paired crash boxes 18. Therefore, in a case where only the crash boxes 18 of the front side members 12 are deformed when the vehicle has a frontal collision at low speed, it is possible to prevent damage to the cross member 52, the paired braces 50, and the paired suspension towers 42. In addition, it is possible to prevent occurrence of force for damaging an object with which the cross member 52 collides.

Also, since the cross member 52 has a rectangular tube shape, rigidity of the cross member 52 can be increased, as compared to a case where the cross member 52 has an open cross section.

Second Embodiment

Figure 5:
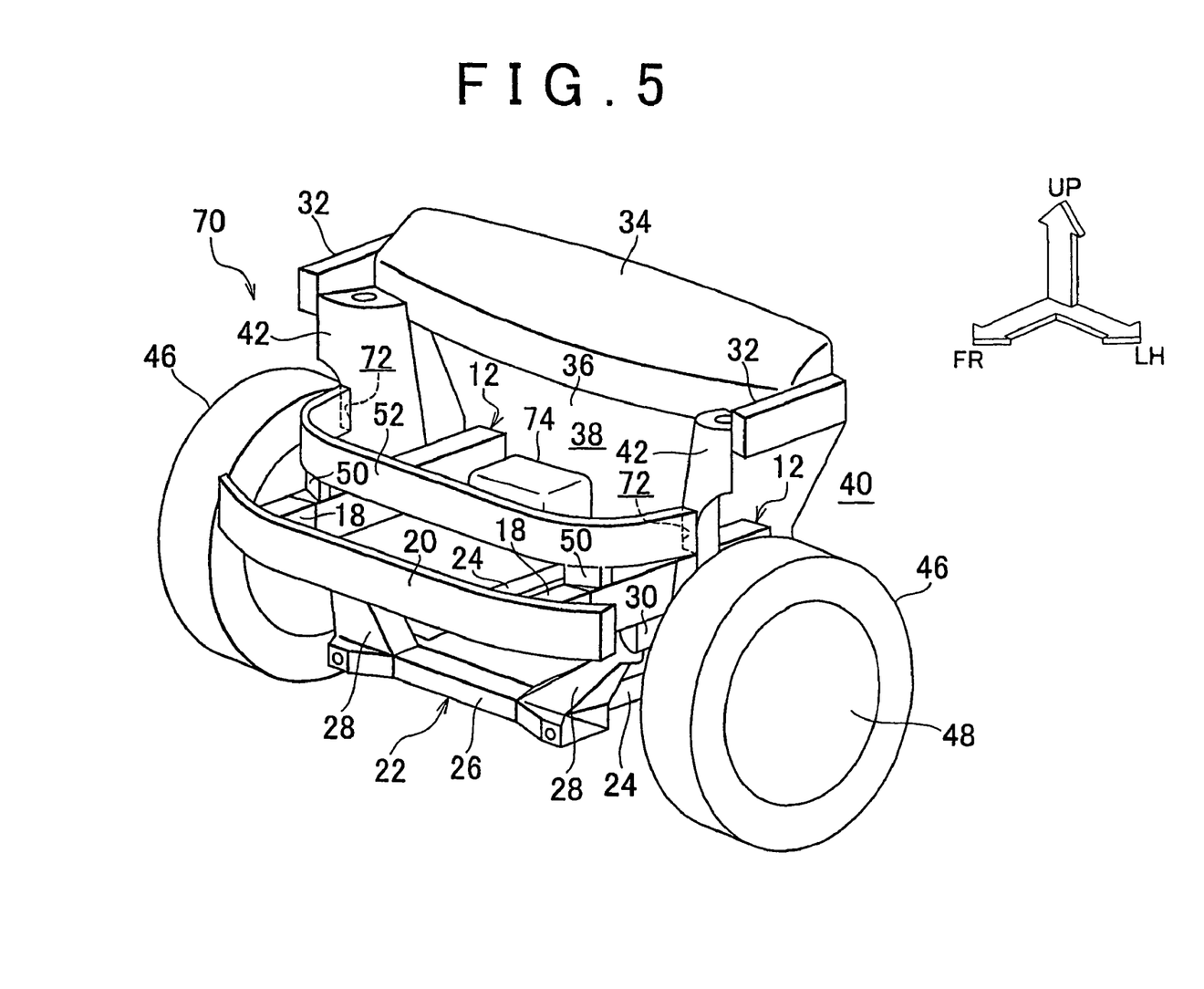
FIG. 5 is a schematic perspective view showing a vehicle front structure according to a second embodiment of the invention when diagonally seen from a position ahead of, and on a left side of a vehicle.

FIG. 5 is a schematic perspective view showing a vehicle front structure 70 according to a second embodiment of the invention when diagonally seen from a position ahead of, and on the left side of the vehicle.

The vehicle front structure 70 according to the second embodiment of the invention has substantially the same configuration as that of the vehicle front structure 10 according to the first embodiment. However, the vehicle front structure 70 is different from the vehicle front structure 10 in the following points.

In the vehicle front structure 70 according to the second embodiment, the cross member 52 is made of highly air-tight material such as an extrusion material. Intake air ports 72 are provided at both ends of the cross member 52. Each of the intake air ports 72 is opened into an inside of the corresponding suspension tower 42.

Figure 6:
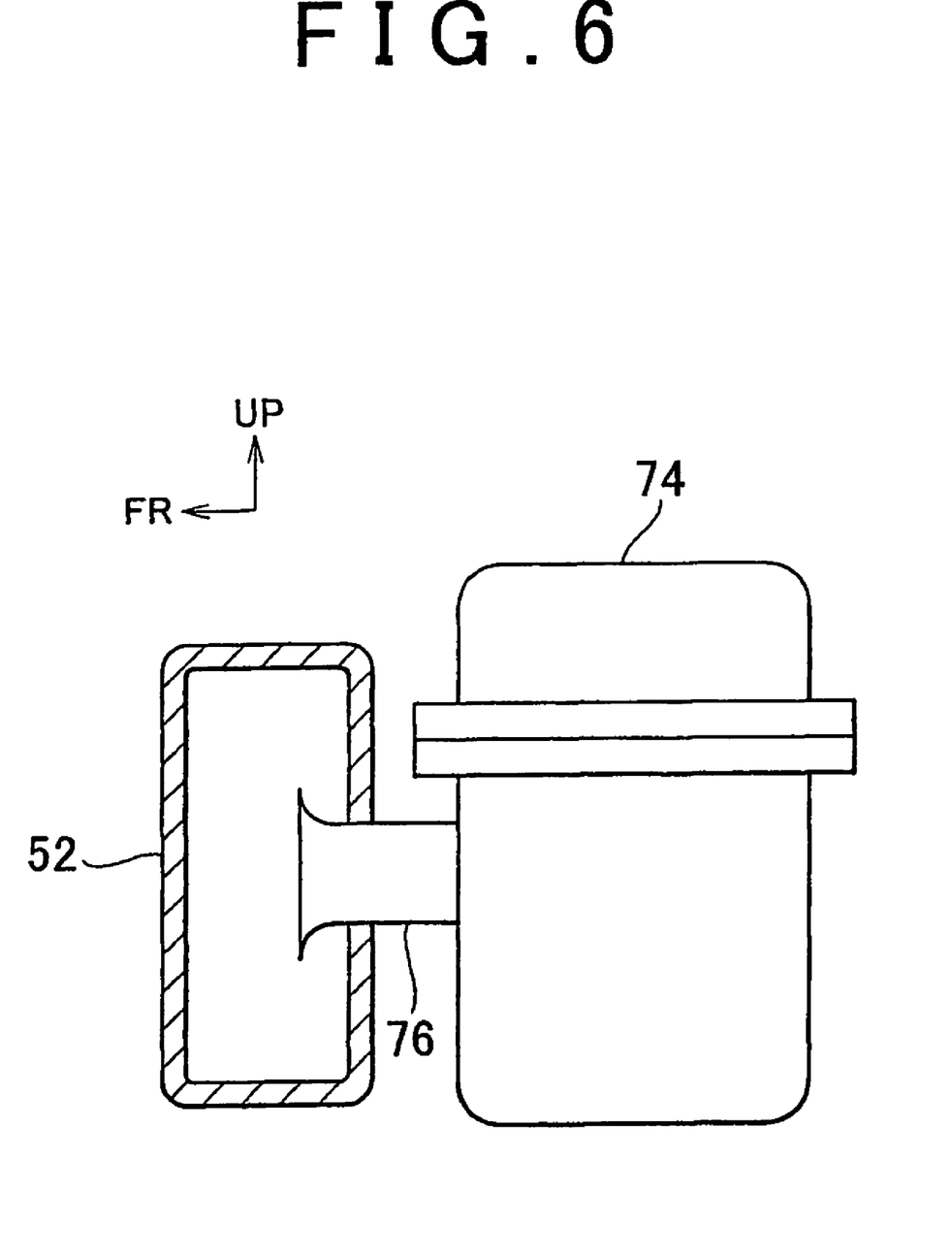
FIG. 6 is a partially broken lateral view showing a cross member, an air cleaner case, and a communication tube in the vehicle front structure according to the second embodiment of the invention when seen from a position on a left side of the vehicle.

The power unit 54 (not shown in FIG. 5) and the cross member 52 are not connected with each other using the torque rod 56 that is used in the first embodiment. An air cleaner case 74 is provided between the vehicle front-side surface of the power unit 54 and the vehicle width-direction center portion of the cross member 52. The air cleaner case 74 has a parallelepiped box shape, and constitutes a load transmission member and an air cleaning mechanism. As shown in FIG. 6, a communication tube 76, which constitutes the load transmission member and the air cleaning mechanism, is fixed to a vehicle front-side surface of the air cleaner case 74. The communication tube 76 is connected with the air cleaner case 74. The communication tube 76 is fixed at the vehicle width-direction center portion of the cross member 52, and the communication tube 76 is connected with the cross member 52. Thus, the air cleaner case 74 and the communication tube 76 are arranged between the vehicle front-side surface of the power unit 54 and the vehicle width-direction center portion of the cross member 52 in the vehicle longitudinal direction such that no space is left between the cross member 52 and the communication tube 76, and between the air cleaner case 74 and the power unit 54.

In the vehicle front structure 70 according to the second embodiment, the air cleaner case 74 and the communication tube 76 are arranged between the vehicle front-side surface of the power unit 54 and the vehicle width-direction center portion of the cross member 52 in the vehicle longitudinal direction such that no space is left between the cross member 52 and the communication tube 76, and between the air cleaner case 74 and the power unit 54. Thus, when the vehicle has a frontal collision at high speed, the collision load can be transmitted from the cross member 52 to the power unit 54 through the air cleaner case 74 and the communication tube 76. Therefore, the air cleaner case 74 and the communication tube 76 can play the same role as that of the torque rod 56 in the aforementioned first embodiment. Accordingly, it is possible to obtain the same effects as those obtained in the first embodiment.

Also, air that is taken into the air cleaner case 74 from the intake air ports 72 through the cross member 52 and the communication tube 76 is cleaned. Thus, since the cross member 52 is used as an air intake duct, the number of components and the number of assemblies can be reduced. Accordingly, it is possible to reduce cost, and to easily arrange, in the engine compartment 38, all the components that need to be arranged in the engine compartment 38 even in the case where the engine compartment 38 is compact, for example, in the case of a compact vehicle. That is, it is possible to improve storage space efficiency when arranging components in the engine compartment 38.

Further, each of the intake air ports 72 of the cross member 52 is opened to the inside of the corresponding suspension tower 42. Therefore, unlike the case where the intake air ports are opened to an inside of the engine compartment 38, cool air can be taken into the air cleaner case 74, and water can be prevented from entering the air cleaner case 74.

In this embodiment, the air cleaner case 74 contacts the power unit 54. However, the air cleaner case 74 may not contact the vehicle front-side surface of the power unit 54 in the vehicle longitudinal direction. In this case, it is preferable that the air cleaner case 74 should be as closest as possible to the vehicle front-side surface of the power unit 54 in the vehicle longitudinal direction.

Third Embodiment

Figure 7:
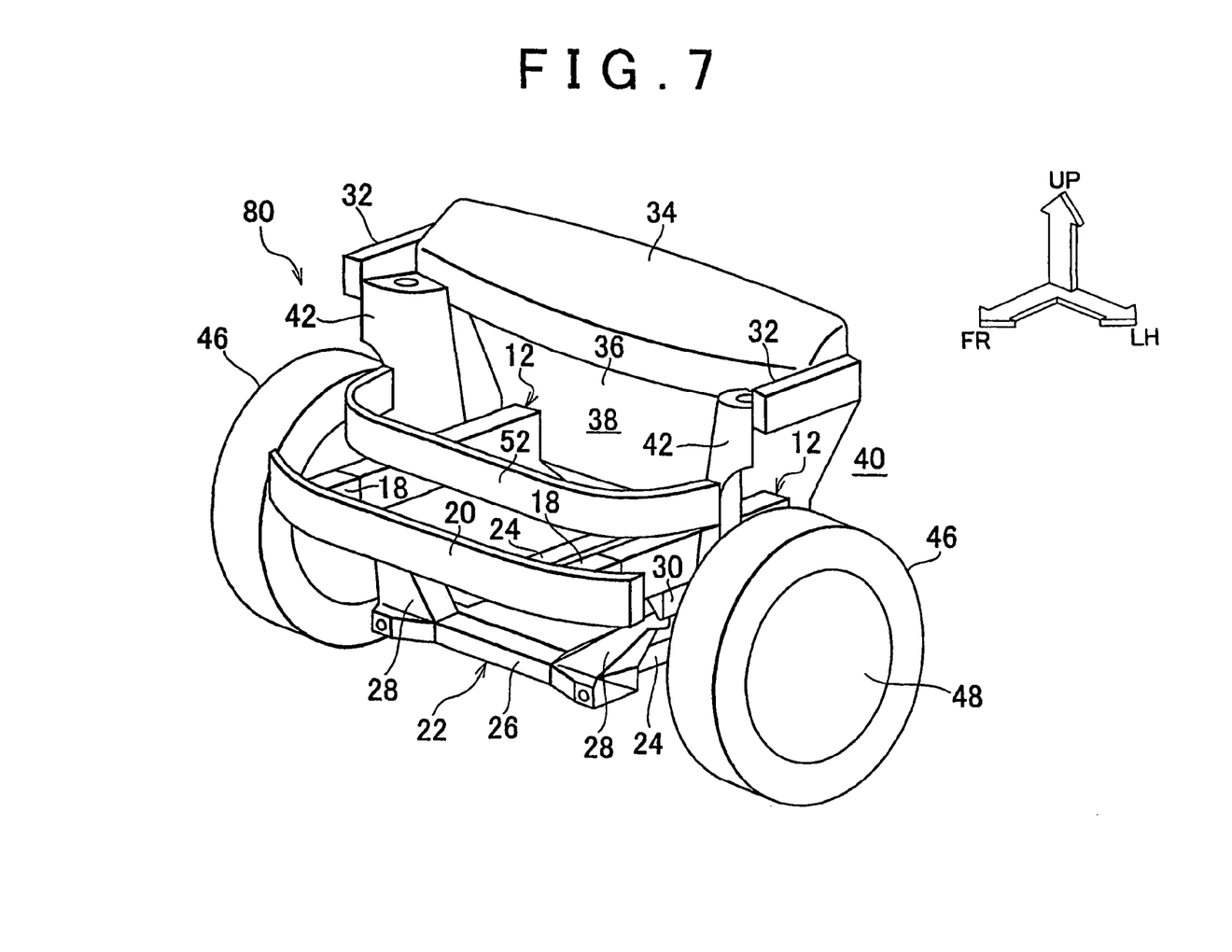
FIG. 7 is a schematic perspective view showing a vehicle front structure according to a third embodiment of the invention when diagonally seen from a position ahead of, and on a left side of a vehicle.

FIG. 7 is a schematic perspective view showing a vehicle front structure 80 according to a third embodiment of the invention when diagonally seen from a position ahead of, and on a left side of a vehicle.

The vehicle front structure 80 according to the third embodiment has substantially the same configuration as that in the first embodiment. However, the vehicle front structure 80 according to the third embodiment is different from the vehicle front structure 10 according to the first embodiment in the following points.

In the vehicle front structure 80 according to the third embodiment, the paired braces 50 that are provided in the first embodiment are not provided. The cross member 52 is not connected with the paired front side members 12, and is disposed above the paired front side members 12 so as to be separated from the paired front side members 12.

In the third embodiment as well, it is possible to obtain the same actions and effects as those obtained in the first embodiment, except the actions and effects obtained by connecting the cross member 52 with the paired front side members 12.

Fourth Embodiment

Figure 8:
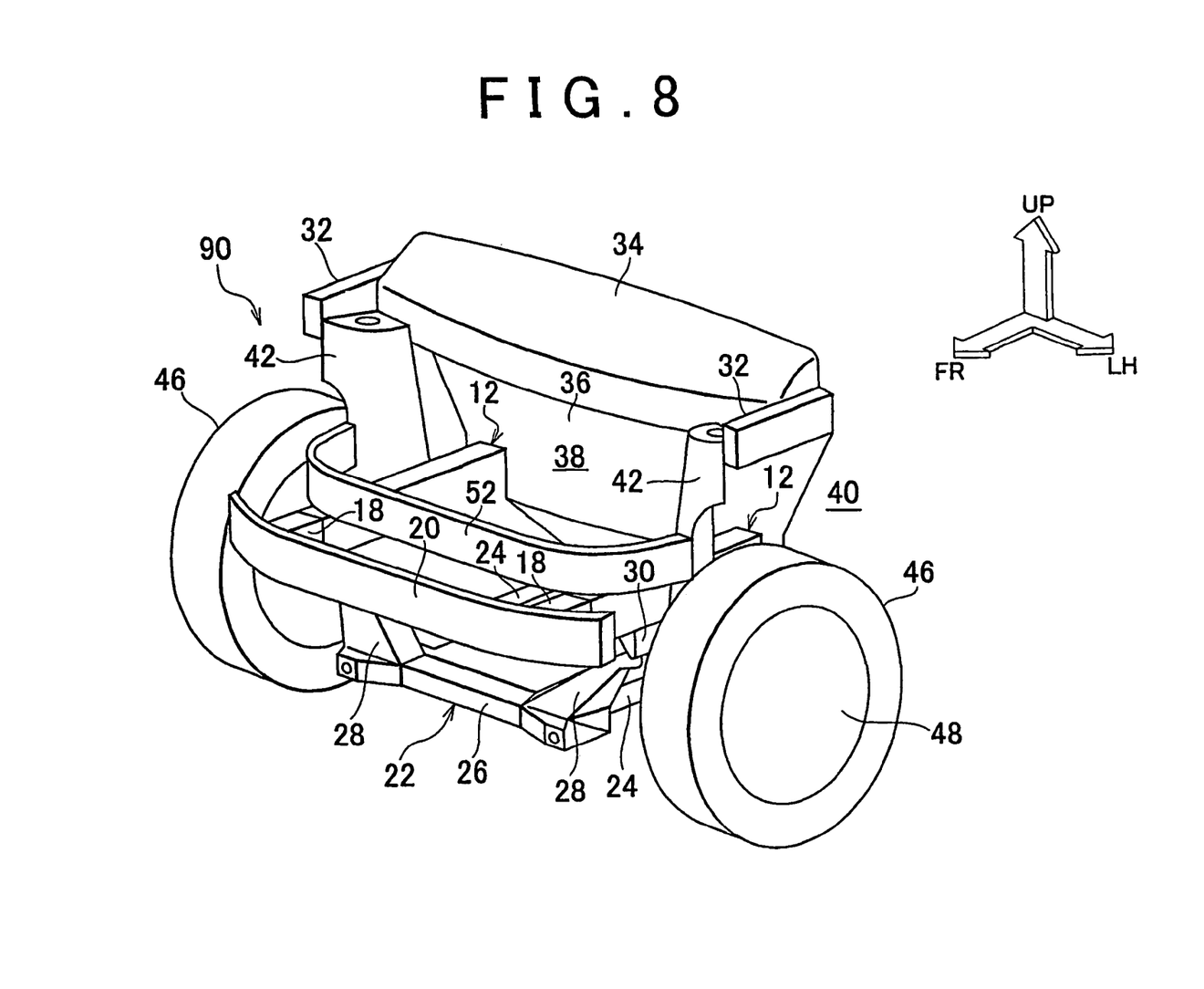
FIG. 8 is a schematic perspective view showing a vehicle front structure according to a fourth embodiment of the invention when diagonally seen from a position ahead of, and on a left side of a vehicle.

FIG. 8 is a schematic perspective view showing a vehicle front structure 90 according to a fourth embodiment of the invention when diagonally seen from a position ahead of, and on a left side of a vehicle.

The vehicle front structure 90 according to the fourth embodiment has substantially the same configuration as that in the first embodiment. However, the vehicle front structure 90 according to the fourth embodiment is different from the vehicle front structure 10 according to the first embodiment in the following points.

In the vehicle front structure 90 according to the fourth embodiment, the paired braces 50 that are provided in the first embodiment are not provided, and the cross member 52 is displaced downward. Each of the curved portions in the vehicle width-direction both end portions of the cross member 52 is fixed to an upper surface of the corresponding front side member 12 at a portion on the vehicle rear side of the vehicle rear-side end of each crash box 18.

In the fourth embodiment as well, it is possible to obtain the same actions and effects as those obtained in the first embodiment.

Fifth Embodiment

Figure 9:
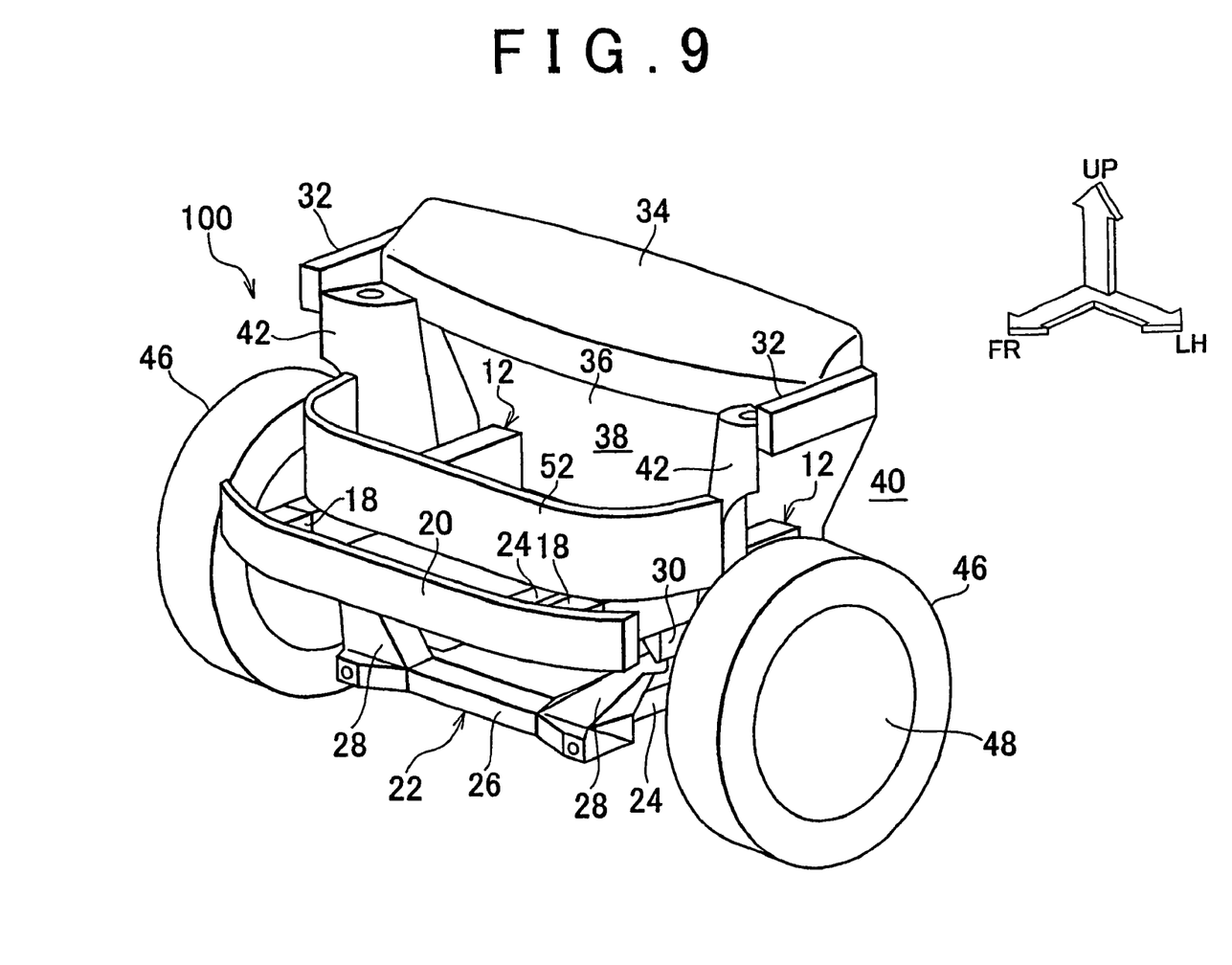
FIG. 9 is a schematic perspective view showing a vehicle front structure according to a fifth embodiment of the invention when diagonally seen from a position ahead of, and on a left side of a vehicle.

FIG. 9 is a schematic perspective view showing a vehicle front structure 100 according to a fifth embodiment of the invention when diagonally seen from a position ahead of, and on a left side of a vehicle.

The vehicle front structure 100 according to the fifth embodiment has substantially the same configuration as that in the first embodiment. However, the vehicle front structure 100 according to the fifth embodiment is different from the vehicle front structure 10 according to the first embodiment in the following points.

In the vehicle front structure 100 according to the fifth embodiment, the paired braces 50 that are provided in the first embodiment are not provided; a vertical direction-width of the cross member 52 is expanded upward and downward; and each of the curved portions in the vehicle width-direction both end portions of the cross member 52 is fixed to an upper surface of the corresponding front side member 12 at a portion on the vehicle rear side of the vehicle rear-side end of each crash box 18.

In the fifth embodiment as well, it is possible to obtain the same actions and effects as those obtained in the first embodiment.

Further, the vertical-direction width of the cross member 52 is expanded upward and downward. Therefore, when one vehicle has a frontal collision with another vehicle whose vehicle height is large such as a sport utility vehicle (SUV) (which serves as a barrier), the cross member 52 can suppress a phenomenon in which a side member of the other vehicle is inserted into the one vehicle (the so-called underride phenomenon) even more effectively.

In the first embodiment, and the third embodiment to the fifth embodiment, the cross member 52 is connected with the power unit 54 using the torque rod 56. However, the cross member 52 may not be connected with the power unit 54. In this case, it is preferable that the vehicle width-direction center portion of the cross member 52 should contact the vehicle front-side surface of the power unit 54 in the vehicle longitudinal direction, or the vehicle width-direction center portion of the cross member 52 should be as closest as possible to the vehicle front-side surface of the power unit 54 in the vehicle longitudinal direction.

Also, in the first embodiment to the fifth embodiment, the vehicle front-side end of the cross member 52 is disposed at the position matching the position of the vehicle rear-side end of each crash box 18 in the vehicle longitudinal direction. However, the vehicle front-side end of the cross member 52 may be disposed on the vehicle rear side of the vehicle rear-side end of each crash box 18. In this case, it is preferable that the vehicle front-side end of the cross member 52 should be as closest as possible to the vehicle rear-side end of each crash box 18 in the vehicle longitudinal direction.

The invention claimed is:

1. A vehicle front structure comprising:
    paired side members which are disposed at a right side portion and a left side portion in a front portion of a vehicle;
    paired suspension towers which are disposed at a right side portion and a left side portion in the front portion of the vehicle, and which support paired suspensions on a vehicle front side, the suspension towers each having upper ends; and
    a cross member which is disposed above the paired side members, which includes extending portions that are disposed at right and left sides in a vehicle lateral direction so as to extend toward a rear side of the vehicle, and which is connected with vehicle front-side portions of the paired suspension towers at edges of the extending portions, at positions spaced away from and below the upper ends of the suspension towers,
    wherein the vehicle front structure includes a bumper reinforce which is connected with vehicle front-side ends of the paired side members, and which is disposed on a vehicle front side of the cross member;
    wherein the cross member is connected with the paired side members at curved portions in the vehicle width-direction of both end portions of the cross member; and
    wherein the extending portions comprise the outermost portions of the cross member.

2. The vehicle front structure according to claim 1, wherein the vehicle front structure includes a bumper reinforce which is connected with vehicle front-side ends of the paired side members, and which is disposed on a vehicle front side of the cross member; and the cross member is connected with the paired side members.

3. The vehicle front structure according to claim 1, wherein paired crash boxes are disposed at vehicle front-side end portions of the paired side members; each of the paired crash boxes has low compressive strength in an axial direction as compared to a portion of each side member other than the crash box; and vehicle rear-side ends of the paired crash boxes are disposed at positions matching positions of vehicle front-side ends of connection portions between the cross member and the paired side members and a position of a vehicle front-side end of the cross member in a vehicle longitudinal direction, or the vehicle rear-side end of the paired crash boxes are disposed on a vehicle front side of the vehicle front-side ends of the connection portions between the cross member and the paired side members and the vehicle front-side end of the cross member.

4. The vehicle front structure according to claim 1, further comprising a load transmission member which connects a power unit in the front portion of the vehicle with the cross member in the vehicle longitudinal direction so that a load can be transmitted between the cross member and the power unit.

5. The vehicle front structure according to claim 1, wherein the power unit in the front portion of the vehicle is disposed on a vehicle rear side of the cross member.

6. The vehicle front structure according to claim 1, further comprising:
    an output shaft which is provided in an engine in the power unit in the front portion of the vehicle, which is disposed along the vehicle lateral direction, and which outputs driving force of the engine; and
    a differential which is provided in the power unit, which is disposed on a vehicle front side of the output shaft, and which transmits the driving force from the output shaft to a front wheel of the vehicle.

7. The vehicle front structure according to claim 1, further comprising a sub frame which has a rectangular frame shape in a plan view, and on which the power unit in the front portion of the vehicle is mounted.

8. A vehicle front structure comprising:
    paired side members which are disposed at a right side portion and a left side portion in a front portion of a vehicle;
    paired suspension towers which are disposed at a right side portion and a left side portion in the front portion of the vehicle, and which support paired suspensions on a vehicle front side, the suspension towers each having upper ends; and
    a cross member which is disposed above the paired side members, which includes extending portions that are disposed at right and left sides in a vehicle lateral direction so as to extend toward a rear side of the vehicle, and which is connected with vehicle front-side portions of the paired suspension towers at edges of the extending portions, at positions spaced away from and below the upper ends of the suspension towers,
    wherein the vehicle front structure includes a bumper reinforce which is connected with vehicle front-side ends of the paired side members, and which is disposed on a vehicle front side of the cross member; and the cross member is connected with the paired side members, and
    wherein a distance between connection portions between the cross member and the paired side members is shorter than a distance between connection portions between the cross member and the paired suspension towers.

9. The vehicle front structure according to claim 1, wherein the cross member has a tubular shape.

10. The vehicle front structure according to claim 9, further comprising:

intake air ports which are formed in the cross member, and which are opened to insides of the suspension towers; and an air cleaning mechanism which is disposed between the power unit in the front portion of the vehicle and the cross member in the vehicle longitudinal direction, which is connected with the cross member, and which cleans air that is taken in from the intake air ports through the cross member.

* * * * *